US005506614A

United States Patent [19]

Fisli

[11] Patent Number: 5,506,614
[45] Date of Patent: Apr. 9, 1996

[54] SELECTIVE OPTICAL ELEMENTS FOR MULTIWAVELENGTH ELECTRONIC PRINT HEADS

[75] Inventor: Tibor Fisli, Los Altos Hills, Calif.

[73] Assignee: Xerox Corporation, Stamford, Conn.

[21] Appl. No.: 89,927

[22] Filed: Jul. 12, 1993

[51] Int. Cl.⁶ .............................. G01D 9/42; G02B 17/00
[52] U.S. Cl. ........................ 347/241; 347/243; 347/244; 359/733
[58] Field of Search .................................. 359/733, 738, 359/233; 351/213, 214, 233; 346/108, 160; 347/134, 256, 241, 242, 243, 244, 258, 259, 260, 261; 355/71

[56] References Cited

U.S. PATENT DOCUMENTS

| 2,207,411 | 7/1940 | Pierce | 351/165 |
|---|---|---|---|
| 3,586,861 | 6/1971 | Wernikoff | 250/549 |
| 4,631,551 | 12/1986 | Vergona | 346/108 |
| 4,679,057 | 7/1987 | Hamada | 346/108 X |
| 4,887,124 | 12/1989 | Yoshino | 355/32 |
| 4,906,081 | 3/1990 | Yasuda | 359/733 |
| 5,014,075 | 5/1991 | Okino | 346/108 |
| 5,161,047 | 11/1992 | Tomita et al. | 346/108 X |
| 5,170,293 | 12/1992 | Tanimoto | 359/799 X |

FOREIGN PATENT DOCUMENTS

| 0601758A1 | 6/1994 | European Pat. Off. . |
|---|---|---|
| 0606141A2 | 7/1994 | European Pat. Off. . |
| 2319917 | 2/1977 | France . |
| 2846662 | 5/1979 | Germany . |
| 3636684A1 | 5/1988 | Germany . |
| 2199465 | 7/1988 | United Kingdom . |

Primary Examiner—Peter S. Wong
Assistant Examiner—Randy W. Gibson

[57] ABSTRACT

The present invention is a thin film coating that may be applied to various optical elements and a method for controlling the size of the imaging spot from multiwavelength sources in an optical path. A selective optical element made in accordance with the principles of the present invention comprises an optical surface. Upon the surface, thin film coatings are deposited that define zones of transmission, each zone transmits a desired wavelength band. Beyond this zone, the surface is effectively opaque to a specified wavelength band. The zones for each wavelength are individually calculated to give an effective aperture for each wavelength such that the spot size for all wavelengths meet user specifications.

2 Claims, 4 Drawing Sheets

SELECTIVE OPTICAL ELEMENTS FOR MULTIWAVELENGTH ELECTRONIC PRINT HEADS

FIELD OF THE INVENTION

The present invention relates in general to optical elements for electronic print heads having multi-wavelength operation, such as for use in full color xerographic printing systems, and in particular, to selective optical elements that create spot sizes of specified areas for various wavelengths focused on the surface of a photoreceptor.

BACKGROUND OF THE INVENTION

The fundamental techniques of xerographic printing are established and well known in the art. Basically, a latent image is formed on a charged photoreceptor by sweeping a modulated laser beam across the surface of the photoreceptor. This latent image is then used to create a permanent image by transferring and fusing toner, that is electrostatically attracted to the latent image, onto a recording medium, usually plain paper.

Extending xerography to include full color printing presents a set of unique problems. For example, the xerographic system must "know" which colors to apply to the recording medium in response to particular laser markings. Many methods have been devised in the current art to overcome this problem.

For example, some xerographic systems apply only one wavelength of light to the surface of the photoreceptor apparatus. The photoreceptor, in turn, interprets the single wavelength as a different color to be applied to the recording medium depending on the particular time or location the light reaches the photoreceptor. A typical system of this type uses a multi-pass method of producing full color prints. The system produces a single wavelength of light that passes across the surface of the photoreceptor several times—each pass interpreted as a separate color. To supply a different color per pass, a different colored toner is applied to the surface of the photoreceptor which is then transferred to the recording medium. This procedure is repeated until each desired color is laid down.

The main disadvantage of this system is speed. Executing multiple passes over the photoreceptor to produce one page of print is slow. Theoretically, if all the different colors could be laid down on the recording medium in one pass, then printing could be sped up by a factor equal to the number of passes.

Accordingly, there are xerographic systems, called "tandem" systems, that lay down all desired colors in a single pass over the surface of the photoreceptor. The architecture of a typical tandem system comprises several independent optical/xerographic subsystems running concurrently. Generally, there are as many subsystems as there are desired colors for printing. In a typical printing pass, each subsystem creates their latent image onto their dedicated photoreceptor simultaneously. The recording medium is circulated from subsystem to subsystem. As the recording medium passes each dedicated photoreceptor, the latent image is then transferred to the medium.

The main disadvantage in producing color images with a tandem system is cost. Each separate subsystem duplicates the number of optical elements. These additional optical elements add to the cost of the system. It would be more cost effective if a single photoreceptor could be addressed by multiple wavelengths using a common optical path.

Using a single optical path and a single photoreceptor, however, necessitates that the photoreceptor apparatus be sensitive to several different wavelengths simultaneously. One system provides a layered photoreceptor whereby each layer reacts to a specific wavelength and passes the remaining wavelengths to the successive layers below. Such a photoreceptor and system are described in U.S. patent applications Ser. Nos. 07/987,886 and 08/000,349 to Kovacs et al, filed on Dec. 9, 1992 and Jan. 4, 1993 respectively and assigned to Xerox Corporation and also in U.S. patent application Ser. No. 07/987,885 to Kovacs, filed on Dec. 9, 1992 and assigned to Xerox Corporation. These application are herein incorporated by reference.

A problem arises when using one optical path for several different -wavelengths of light. When all the various wavelengths pass through an aperture whose size is common to all wavelengths, .the spots of different wavelengths that form on the surface of a photoreceptor vary in size directly with wavelength. Thus, as the wavelength increases, so does the size of the imaging spot. This represents a problem in a laser printer which typically employs a single optical path consisting essentially of lenses and mirrors.

For most printing applications, the size of the imaging spot should be equal for all wavelengths. Otherwise, the final printout will be other than what the user intended. There is no logical reason why a red spot should always be larger than a blue one from a user's perspective. For other applications, it might be desirable to specify different spot sizes for different wavelengths. For example, a user may desire larger spots for the color blue than red. Additionally, the user may want to specify the exact size of the spot.

Thus, there has been a need to create an optical path that does not scale the number of optical elements according to the number of discrete wavelengths while, at the same time, produces spots of a specified size without regard to wavelength.

It is thus an object of the present invention to provide a single optical path for multiple wavelengths that produces specified spot sizes.

SUMMARY OF THE INVENTION

In summary, the present invention is a thin film coating that may be applied to various optical elements and a method for controlling the size of the imaging spot from multiwavelength sources in an optical path. A selective optical element made in accordance with the principles of the present invention comprises an optical surface. Upon the surface, thin film coatings are deposited that define zones of transmission, each zone transmits a desired wavelength band. Beyond this zone, the surface is effectively opaque to a specified wavelength band. The zones for each wavelength are individually calculated to give an effective aperture for each wavelength such that the spot size for all wavelengths meet user specifications.

One advantage of the present invention is that full color xerography may be achieved using a single optical path and a single photoreceptor.

Another advantage of the present invention is that a single optical element may act as several effective apertures for multiple wavelengths without adding to the number of distinct optical elements in the optical path.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 1A:
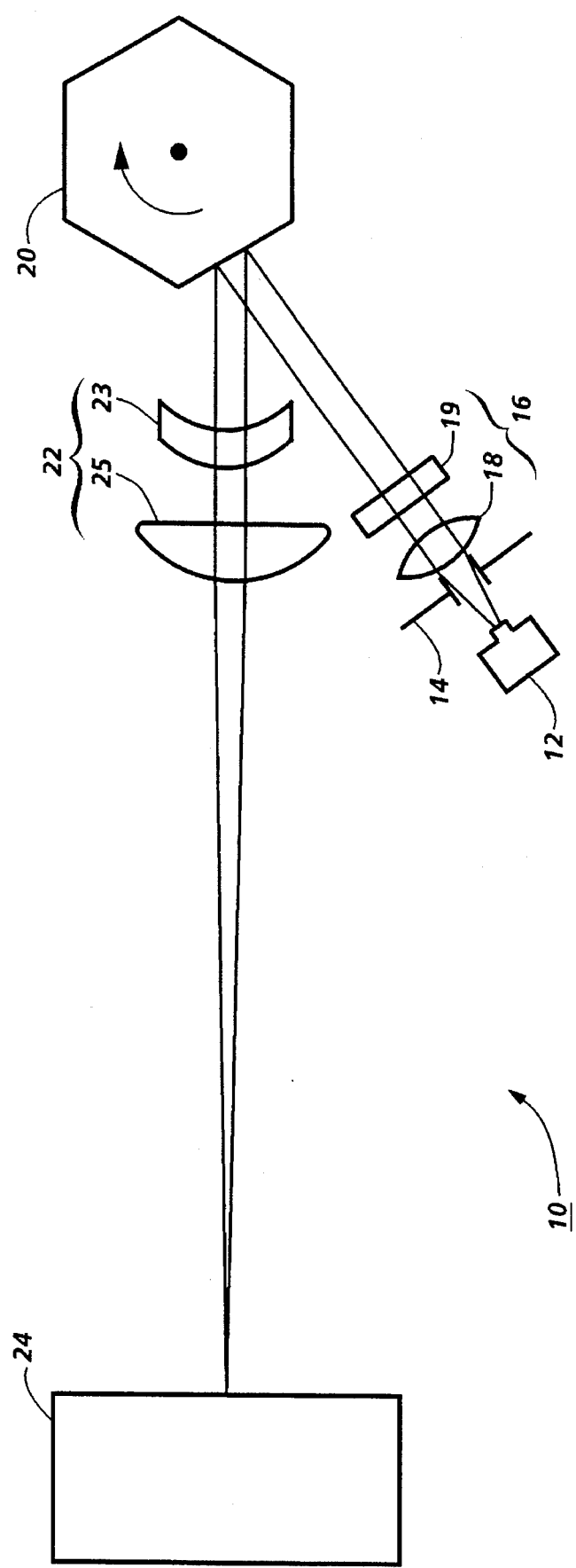
FIG. 1A depicts a tangential view of the optical system of a current xerographic system.

Referring now to FIG. 1A, a highly simplified diagram of a typical optical system is depicted. Laser source 12 emits the light to be imaged on the surface of photoreceptor 24. In a multi-beam configuration, laser 12 might comprise several closely spaced laser diodes. These diodes emit different wavelengths depending on the mode of operation. The beam itself would actually consist of closely bundled beams. Additionally, each laser source could be independently addressable. Thus, in a multi-wavelength mode, different wavelengths could be imaging at different times and places on the photoreceptor to produce different shades of color.

Figure 1B:
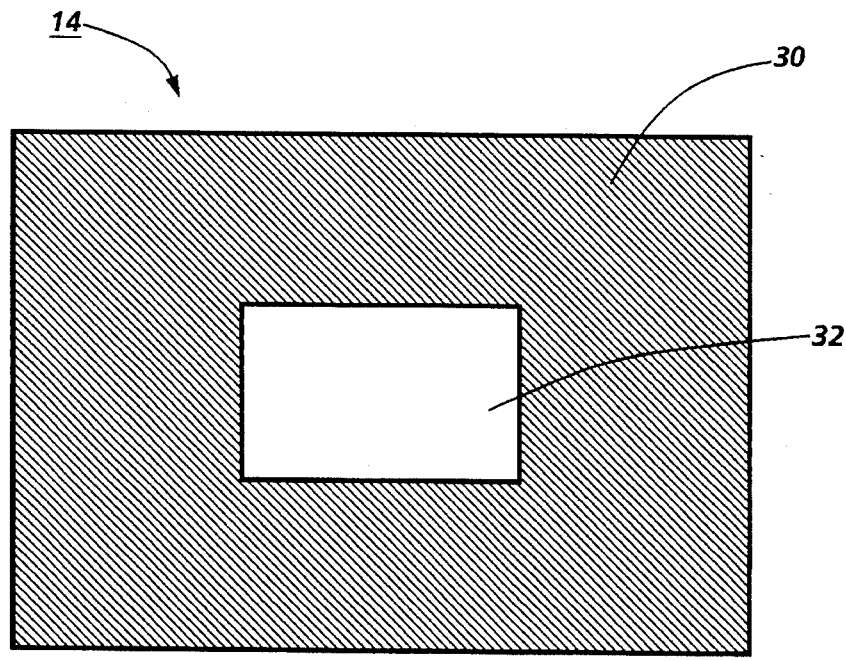
FIG. 1B shows a front view of an optical aperture as currently practiced.

Optical aperture 14 initially sizes the beam of light for input optics 16. A typical optical aperture is depicted in FIG. 1B. Optical aperture 14 generally comprises opaque frame 30 that may be constructed out of an opaque material such as glass or metal or the like. Light passes through opening 32 in the center of frame 30. Opening 32 may be constructed out of some translucent material such as glass or the like. Alternatively, opening 32 might be a hole cut into frame 30. In either case, the light passing through aperture 14 is sized for input optics 16 and is generally not focused or dispersed in any manner by the aperture.

Input optics 16 comprises a series of lenses 18 and 19. Lens 18 acts to collimate the beam onto rotating polygon mirror 20. Lens 19 is a cylindrical lens and has no power in the tangential meridian. A rotating polygon mirror is typically used to provide the necessary deflection of the light beam for horizontal scanning across the photoreceptor. It should be appreciated that many other scanning techniques not involving rotating mirrors are known in the art and that the present invention should not be limited to the particular scanning technique. Similarly, the optical system is generically depicted in FIG. 1A and the present invention should not be accordingly limited. In fact, the present invention may be adapted to work with any particular optical system architecture that produces varying image spot sizes for different wavelengths.

Figure 1C:
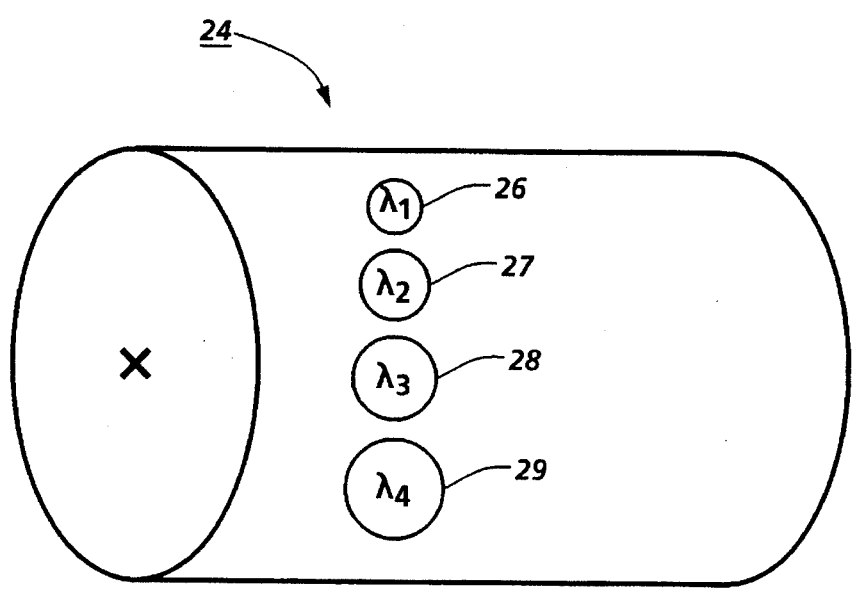
FIG. 1C depicts the relative size of the imaging spots for various wavelengths of light as produced by the optical system as practiced in FIG. 1A.

The deflected beam is then passed through corrective optics 22 which comprises various optical elements 23 and 25. Corrective optics 22 are generally used to focus the scan and provide correction for any wobble that may be present in the rotating polygon mirror. After the light leaves optics 22, individual, closely bundled beams 26, 27, 28, and 29 (as shown in FIG. 1C) illuminate photoreceptor 24.

In a working xerographic system producing full color, the various beams are interpreted to be different colors. As described above, photoreceptor 24 may have a layered construction. Each layer is sensitive to a particular wavelength and passes the other wavelengths to the layers beneath. These layers, in turn, are interpreted as a separate color to be transferred to the recording medium. It will be appreciated that the present invention should not be limited by the particular choice of photoreceptor.

If the system of FIG. 1A is operating in multi-wavelength mode, then the different beams of light will be imaged onto photoreceptor 24 with varying spot sizes. In fact, the size of the spot varies according to the following equation:

$$\text{SPOT SIZE} = K * F\# * \lambda \quad (1)$$

where K is a function of both the method of aperture illumination and the point of power defining the spot size (e.g. full width half max, or $1/\epsilon^2$), F# is the f-number and $\lambda$ is the wavelength of the imaged beam. The f-number is defined as:

$$F\# = \text{Focal Length/Aperture Size} \quad (2)$$

where the focal length is the distance between the second principal plane of the optical system and the focal point.

The effect of these equations is shown in FIG. 1C. Photoreceptor 24 is shown with four different beams 26, 27, 28, and 29 focused on its surface. The wavelengths of these beams are related as follows:

$$\lambda_1 < \lambda_2 < \lambda_3 < \lambda_4 \quad (3)$$

Accordingly, the spot sizes of these beams are shown to vary directly to their wavelengths—$\lambda_1$ the smallest spot and $\lambda_4$ the largest.

This variation in spot size is highly undesirable in xerography. It is uncommon for certain colors to be consistently larger than other colors. For example, there is no logical reason for red pixel to always be larger than blue pixel.

Figure 2A:
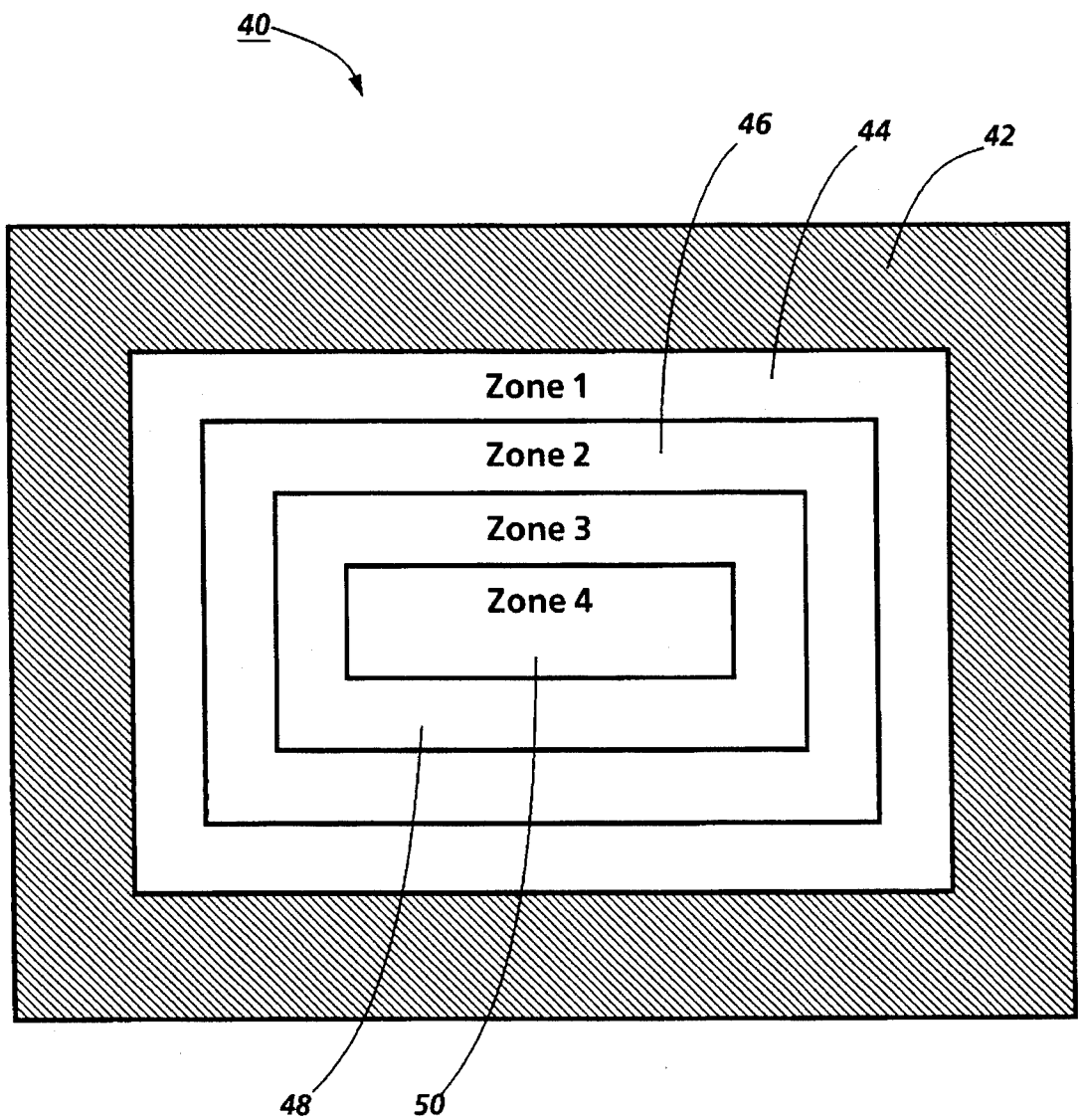
FIG. 2A shows a front view of an optical aperture as made in accordance with the principles of the present invention.

The present invention solves this problem by providing a method for producing spots of any desired size for any wavelength imaging on a photoreceptor. A thin film coating may be applied to various optical elements to control the effective aperture for any particular wavelength. For example, the present invention may be applied to an optical aperture, a lens or a mirrored surface in the optical path. In particular, FIG. 2A shows optical aperture 40 made in accordance with the principles of the present invention. Aperture 40 consists of an opaque shell 42 that may be constructed from some opaque material such as glass or metal or the like. The opening in shell 42 is a set of thin film layers 44, 46, 48, and 50 which, in effect, provide a different size aperture for different wavelengths.

The net effect of supplying different size apertures for different wavelengths is seen in Equation 2. Assuming two different wavelengths $\lambda_1$ and $\lambda_4$ where $\lambda_1 < \lambda_4$, if the effective aperture for $\lambda_4$ (i.e. $Ap(\lambda_4)$) is larger than $Ap(\lambda_1)$, then the F# of $\lambda_4$ (i.e. $F\#(\lambda_4)$) is smaller than $F\#(\lambda_1)$. Restating:

$$\text{if } Ap(\lambda_4) > Ap(\lambda_1) \text{ then } F\#(\lambda_4) < F\#(\lambda_1) \qquad (4)$$

From equation 1, it can be seen that if the ratio of wavelength-to-effective aperture is equal then the spot sizes for different wavelengths will be equal. In mathematical terms:

$$\text{if } \lambda_1/Ap(\lambda_1) = \lambda_4/Ap(\lambda_4) \text{ then Spot Size } (\lambda_1) = \text{Spot Size } (\lambda_4) \qquad (5)$$

Thus, by controlling the effective aperture sizes for various wavelengths, it is possible to produce uniform spot sizes in a system having a common optical path.

In a like manner, any specified spot size may be created, up to a maximum size, for any given wavelength. This is accomplished by setting the effective aperture such that:

$$Ap(\lambda) = (K * \text{Focal Length} * \lambda)/\text{Specified Spot Size} \qquad (6)$$

The maximum spot size for any given wavelength occurs when the effective aperture equals the full aperture size allowed by the optical system.

The present invention controls the effective aperture by creating different zones of transmission within a single optical element. These zones of transmission are created by applying different thin film coatings to the different zones. These different coatings determine which wavelengths will be transmitted and which will be blocked according to their optical properties.

These coatings may be applied to a variety of optical elements. FIG. 2A shows the present invention as applied to the surface of an aperture. Aperture 40 is divided into four zones of transmission 44, 46, 48, and 50. These zones are marked Zone 1, 2, 3, and 4 respectively.

A presently preferred embodiment provides different effective apertures with the goal of providing uniform spot sizes for the wavelengths 670 nm, 780 nm, 830 nm, and 900 nm. Zone 4 is designed to transmit all four wavelengths of light. Zone 3 is designed to transmit 780 nm, 830 nm, and 900 nm only—thus, blocking transmission of 670 nm. Zone 2 is designed to transmit 830 nm and 900 nm only. Zone 1 is designed to transmit 900 nm only. It will be appreciated that the present invention should not be limited to the any particular number of zones, particular working wavelengths, or particular coatings described for the presently preferred embodiment. Indeed, the present invention contemplates the use of this technique for any arbitrary number of zones and wavelengths. The particular coatings will vary according to the wavelengths selected.

The presently preferred embodiment is constructed by coating a glass substrate with various thin films that alter the transmissibility of the regions on which they are deposited. For example, since zone 4 is meant to transmit all four wavelengths of light, zone 4 remains uncoated—the glass substrate transmits all wavelengths. Zone 3 is coated with a standard longwave pass design. Using the standard thin film nomenclature, zone 3 comprises:

S-H/2 (LH)$^8$ LH/2-A where

H=TiO$_2$, n=2.35, quarter wave thick @600 nm.
L=SiO$_2$, n=1.43, quarter wave thick @600 nm.
S=Substrate
A=Air.

Zone 2 consists of:

S-H/2(LH)$^6$ LH/2 h/2 (L'h)$^6$ L'h/2- A where

H=TiO$_2$, n=2.35, quarter wave thick @666 nm.
L=SiO$_2$, n=1.43, quarter wave thick @666 nm.
h=Al$_2$O$_3$, n=1.65, quarter wave thick @755 nm.
L'=SiO$_2$, n=1.43, quarter wave thick @755 nm.
S=Substrate
A=Air.

Zone 1 consists of:

S-H/2 (LH)$^8$ H/2-A where

H=TiO$_2$, n=2.35, quarter wave thick @722 nm.
L=SiO$_2$, n=1.43, quarter wave thick @722 nm.
S=Substrate
A=Air.

Opaque area 42 blocks transmission of all wavelengths and may consist of an opaque glass or metal or glass coated with opaque material or the like. It should be appreciated that while aperture 40 and the various zones are depicted as rectangular regions, the present invention works equally well on circular regions or other arbitrarily chosen designs that are optimized for different spot geometries.

Figure 2B:
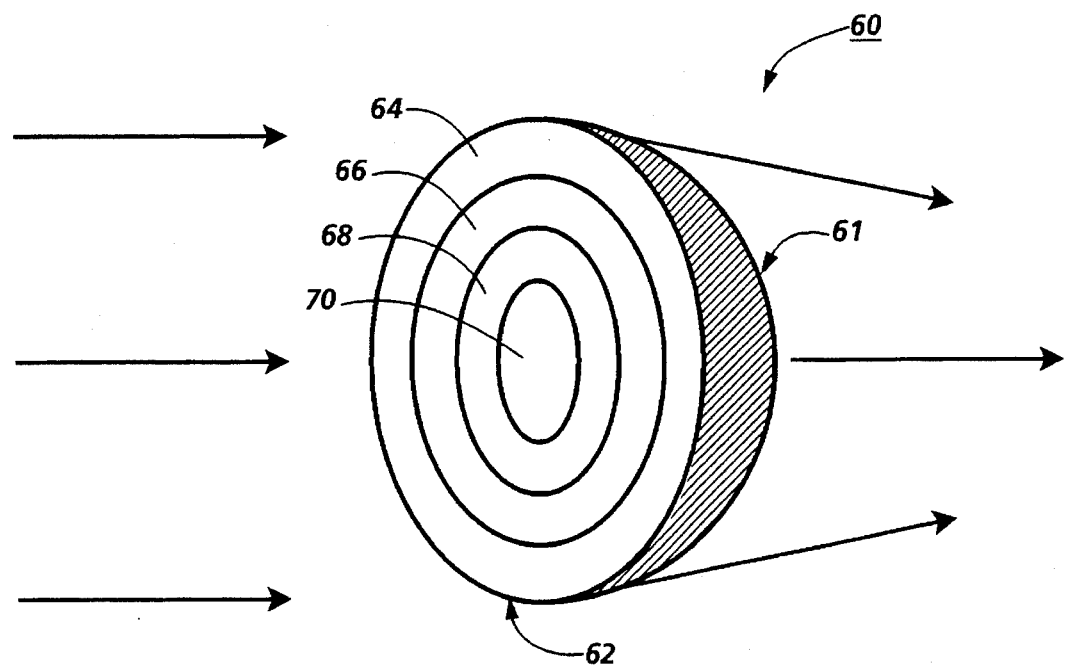
FIG. 2B shows a perspective view of a lens as made in accordance with the principles of the present invention.

The use of thin film coatings to control effective apertures is not limited to optical apertures. In fact, thin film coatings may be deposited on other optical elements to achieve the same effect. FIG. 2B shows a perspective view of a lens made in accordance with the principles of the present invention. Lens 60 as depicted comprises flat surface 62 and curved surface 61. On surface 62, thin film coatings may be deposited, thus defining zones of transmission 64, 66, 68, and 70. In the same manner as for the case of the aperture, the coatings upon lens 60 would size the spots according to user specifications by controlling the effective aperture of the multiple wavelengths. Although the lens in FIG. 2B is shown with a flat surface, it will be appreciated that similar coatings can be devised for curved surfaces if the thickness of the coatings is varied to adjust for the curvature.

Figure 2C:
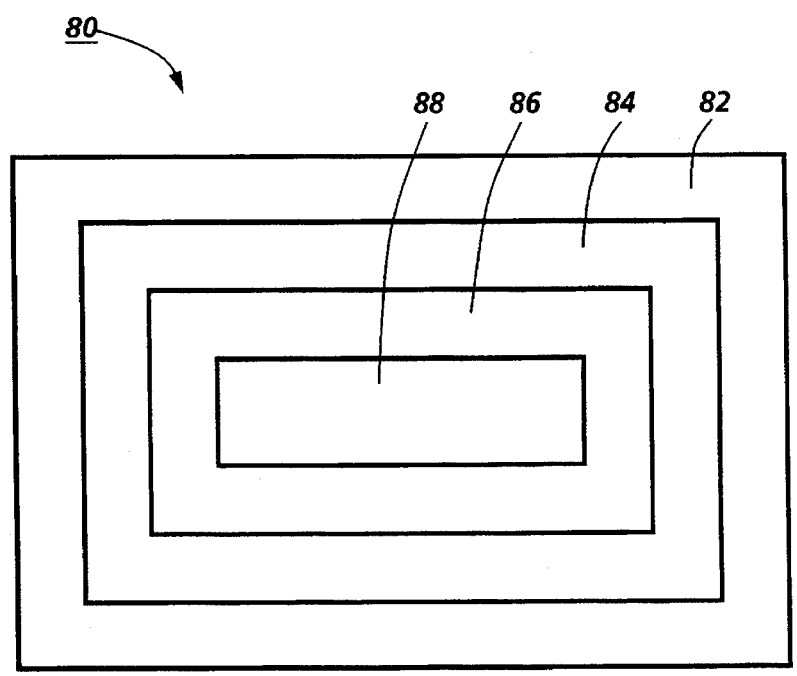
FIG. 2C shows a front view of a mirrored surface made in accordance wit h the principles of the present invention.

In another potential application, thin film coatings may be applied to the mirrored surfaces used in the optical system. FIG. 2C shows a front view of mirrored surface 80 made in accordance with the principles of the present invention. As shown, the coatings placed on mirrored surface 80 produce four zones of transmission 82, 84, 86, and 88. It will be appreciated that mirrored surface 80 may be either flat or curved.

In regards to mirrored surfaces, the best mode of practicing the present invention is to apply the thin film on mirrored surfaces located on the input side of the optical path. The input side is that portion of the optical path before the scanning deflection of the beam. Likewise, it will be appreciated that it would be also possible to practice the present invention on the mirrored facets of a rotating polygon in a facet tracked or over-filled optical system.

In summary, it will be appreciated that the present invention provides a method and apparatus for producing specified spot sizes for various wavelengths that share a common optical path. This specificity enables laser xerographic systems to produce even, balanced color images from a multi-wavelength mode of operation that use a single photoreceptor.

It should be appreciated that the application of the present invention works for various wavelengths and that others skilled in the art may devise other thin film coatings to suit their particular choice of wavelengths.

Likewise, it should be appreciated that, although the presently preferred embodiment is constructed so that the zones of transmission are concentric regions with the innermost region transmitting all wavelengths and each successive outer region blocking a single wavelength, it is possible to employ the present invention in a variety of designs and that the present invention should not be limited to the design and architecture of the preferred embodiment. For example, the zones of transmission could be designed so that the zones are not concentric. Instead, the zones could be individual regions upon the substrate that transmit only one or a selected number of wavelengths. Alternatively, the outermost zone might transmit all wavelengths and each successive inner zone blocks a selected band of wavelengths.

What is claimed:

1. An optical element positionable in an optical path shared by multiple wavelengths of light, the optical path of each wavelength of light terminating at the photoreceptor surface in a spot of a specified size, said optical element comprising:

a mirrored surface upon which light directed along the optical path is reflected; and a thin film coating disposed on said mirrored surface to define wavelength dependent zones of transmission, each said zone transmitting to the mirrored surface a selective band of wavelengths such that the effective aperture of each said multiple wavelength produces light having the specified spot size on the photoreceptor surface.

2. An optical system defining an optical path shared by multiple wavelengths of light, the optical path of each wavelength of light terminating at a photoreceptor surface in a spot of a specified size, the optical system comprising:

a source of multiple wavelength light;

a photoreceptor surface configured to receive the multiple wavelength light; and an optical element positioned in an optical path between the source of multiple wavelength light and the photoreceptor surface, the optical element having two or more transmission zones that together provide a different effective aperture for each of the respective wavelengths of light to adjust the specified size of the spot at the photoreceptor surface, with the optical element defining a central aperture centered on the optical path for transmission therethrough of light of all wavelengths, a first zone surrounding the central aperture to selectively block transmission of light of a first specified wavelength, and a second zone surrounding the first zone to block transmission of light of a first specified wavelength and a second specified wavelength.

* * * * *